US012637530B2

(12) United States Patent
Shen et al.

(10) Patent No.: US 12,637,530 B2
(45) Date of Patent: May 26, 2026

(54) FOAMABLE RESIN COMPOSITION

(71) Applicant: PANCOLOUR INK CO., LTD., Taoyuan City (TW)

(72) Inventors: Wen-Chang Shen, Taoyuan City (TW); Kuei-Yuan Chang, Taoyuan City (TW); Mei-Chuan Hsu, Taoyuan City (TW)

(73) Assignee: PANCOLOUR INK CO., LTD., Taoyuan City (TW)

( * ) Notice: Subject to any disclaimer, the term of this patent is extended or adjusted under 35 U.S.C. 154(b) by 734 days.

(21) Appl. No.: 17/944,210

(22) Filed: Sep. 14, 2022

(65) Prior Publication Data

US 2024/0084064 A1     Mar. 14, 2024

(51) Int. Cl.
*C08F 283/00*     (2006.01)
*C08J 9/10*     (2006.01)
*C08K 3/22*     (2006.01)

(52) U.S. Cl.
CPC ........... *C08F 283/008* (2013.01); *C08J 9/103* (2013.01); *C08K 3/22* (2013.01); *C08J 2203/04* (2013.01); *C08J 2351/08* (2013.01); *C08K 2003/2296* (2013.01)

(58) Field of Classification Search
CPC ... B33Y 70/10; C08J 9/02; C08J 9/103; C08J 2351/08; C08J 2203/04; C08F 290/067; C08F 283/008; C08F 283/04; C08F 20/26–28; C08K 2003/2296; C08K 3/22
See application file for complete search history.

(56) References Cited

U.S. PATENT DOCUMENTS

2011/0250415 A1*    10/2011    Kim ..................... C09D 151/08
522/170

FOREIGN PATENT DOCUMENTS

CN          113881389 A  *  1/2022
JP          2008239833 A  *  10/2008

OTHER PUBLICATIONS

Machine translation of CN113881389A by Huang et al. (Year: 2022).*
Machine translation of JP2008239833A by Ito et al. (Year: 2008).*
CN966J75 by Sartomer Americas. Available at https://americas.sartomer.arkema.com/en/product-finders/product/f/sartomer_Urethane_US/p/cn966j75/. Wayback capture Jul. 1, 2022. (Year: 2022).*

* cited by examiner

*Primary Examiner* — Christina H. W. Rosebach

(57)          ABSTRACT

A foamable resin composition comprising: (meth)acrylate oligomer, which accounts for 10-40 wt % of the foamable resin composition; (meth)acrylate monomer, which accounts for 35-80 wt % of the foamable resin composition; a photocuring initiator, which accounts for 1-5 wt % of the foamable resin composition; and a foaming agent, which accounts for 3-20 wt % of the foamable resin composition; wherein the foamable resin composition has a specific gravity of 0.10-1.05 g/cm$^3$ after photocuring and thermal foam expansion for 15-20 minutes at 120° C. The aforementioned foamable resin composition can become a low specific gravity (0.10-1.05 g/cm$^3$) material after photocuring and thermal foam expansion, then can expand the application in 3D printing, and manufacture of plastic products, such as shoe soles, coasters, floats, various types of protective gear and the like.

7 Claims, 2 Drawing Sheets

FOAMABLE RESIN COMPOSITION

BACKGROUND OF THE INVENTION

1. Field of the Invention

The present disclosure relates to a foamable resin composition.

2. Description of the Related Art 3D printing refers to any process that can print a three-dimensional object. 3D printing is primarily a process of continuous addition, in which an original material is laminated under computer control. The printed content of 3D printing can come from three-dimensional models or other electronic data, and the three-dimensional object printed can have arbitrary shapes and geometric features.

In recent years, some people have used photocuring resin as the original material in 3D printing technology, and introduced photocuring technology, which has successively extended 3D printing equipment used in applications such as stereo lithography appearance (SLA), direct light processing (DLP), liquid crystal displays (LCD), and widely manufactured plastic products using the above 3D printing equipment.

BRIEF SUMMARY OF THE INVENTION

However, after years of development, although it is possible to use the traditional photocuring resin to widely manufacture plastic products through 3D printing technology, it will be limited in simulating material design because the traditional photocuring resin has a relatively large specific gravity (about 1.08-1.20 $g/cm^3$). Specifically, although the traditional photocuring resin can manufacture strong and high specific gravity plastic products, such as plastic shells, plastic tubes and plastic sheets and the like, the traditional photocuring resin is not suitable for manufacturing plastic products, such as shoe soles, coasters, floats, various types of protective gear and the like that appeal to characteristics of lightweight, high elasticity and anti-collision and shock absorption.

Next, because the traditional photocuring resin is a thermosetting resin, after curing, it will not soften or deform even if it is heated. In other words, even if the traditional photocuring resin is added with a foaming agent, it is still unable to foam and expand after being heated. This also limits the application of the traditional photocuring resin in 3D printing, and there is room for further improvement.

The inventors have found that a foamable resin composition with a specific composition can become a low specific gravity (0.10-1.05 $g/cm^3$) material after photocuring and thermal foam expansion, this can expand the application in 3D printing, and manufacture of plastic products, such as shoe soles, coasters, floats, various types of protective gear and the like.

In order to solve the above problems, an aspect of the foamable resin composition of the present disclosure comprises: (meth)acrylate oligomer, which accounts for 10-40 wt % of the foamable resin composition; (meth)acrylate monomer, which accounts for 35-80 wt % of the foamable resin composition; a photocuring initiator, which accounts for 1-5 wt % of the foamable resin composition; a foaming agent, which accounts for 3-20 wt % of the foamable resin composition; wherein the foamable resin composition has a specific gravity of 0.10-1.05 $g/cm^3$ after photocuring and thermal foam expansion for 15-20 minutes at 120° C.

In an embodiment, the (meth)acrylate oligomer is polyurethane (meth)acrylate or full acrylate oligomer, and has a glass transition temperature less than 50° C., and a rate of elongation of 100-1000%.

In an embodiment, the (meth)acrylate monomer comprises a monofunctional monomer of 20-80 wt % and a bifunctional monomer of 0-30 wt %.

In an embodiment, the monofunctional group is at least any one selected from the group consisting of the following: isobornyl acrylate, isobornyl methacrylate, 2-phenoxy ethyl acrylate, monofunctional polyurethane acrylate, o-phenylphenol EO acrylate, cyclic trimethylolpropane formal acrylate, tetrahydrofurfuryl acrylate, lauryl acrylate, acryloylmorpholine, N-vinylpyrrolidone and ethoxyethoxyethyl acrylate.

In an embodiment, the bifunctional monomer is at least any one selected from the group consisting of the following: polyethylene glycol 400 diacrylate, polyethylene glycol 600 diacrylate, polyethylene glycol 1000 diacrylate, neopentyl glycol 2PO diacrylate, bisphenol A 2EO diacrylate, bisphenol A 4EO diacrylate, bisphenol A 10EO diacrylate, bisphenol A 30EO diacrylate.

In an embodiment, the photocuring initiator is selected from diphenyl-(2,4,6-trimethylbenzoyl) phosphine oxide or bis(2,4,6-trimethylbenzoyl)-phenylphosphine oxide.

In an embodiment, the foaming agent is at least any one selected from the group consisting of the following: azodicarbonamide, calcium carbonate, magnesium carbonate, sodium bicarbonate, 4,4'-oxydibenzenesulfonyl hydrazide and foamed microspheres.

In an embodiment, a viscosity of the foamable resin composition at 25° C. is 150-1000 cps.

In an embodiment, the foamable resin composition further comprises: zinc oxide, which accounts for 1-5 wt % of the foamable resin composition.

In an embodiment, a single-dimensional size expansion ratio of the foamable resin composition after thermal foam expansion at 120° C. is 5-50%.

An aspect of the present disclosure is completed based on the problems of the prior art, the object of which is to provide a foamable resin composition with a specific composition. Further, the foamable resin composition can become a low specific gravity (0.10-1.05 $g/cm^3$) material after photocuring and thermal foam expansion, then can expand the application in 3D printing, and manufacture of plastic products, such as shoe soles, coasters, floats, various types of protective gear and the like.

DETAILED DESCRIPTION OF THE INVENTION

Figure 1:
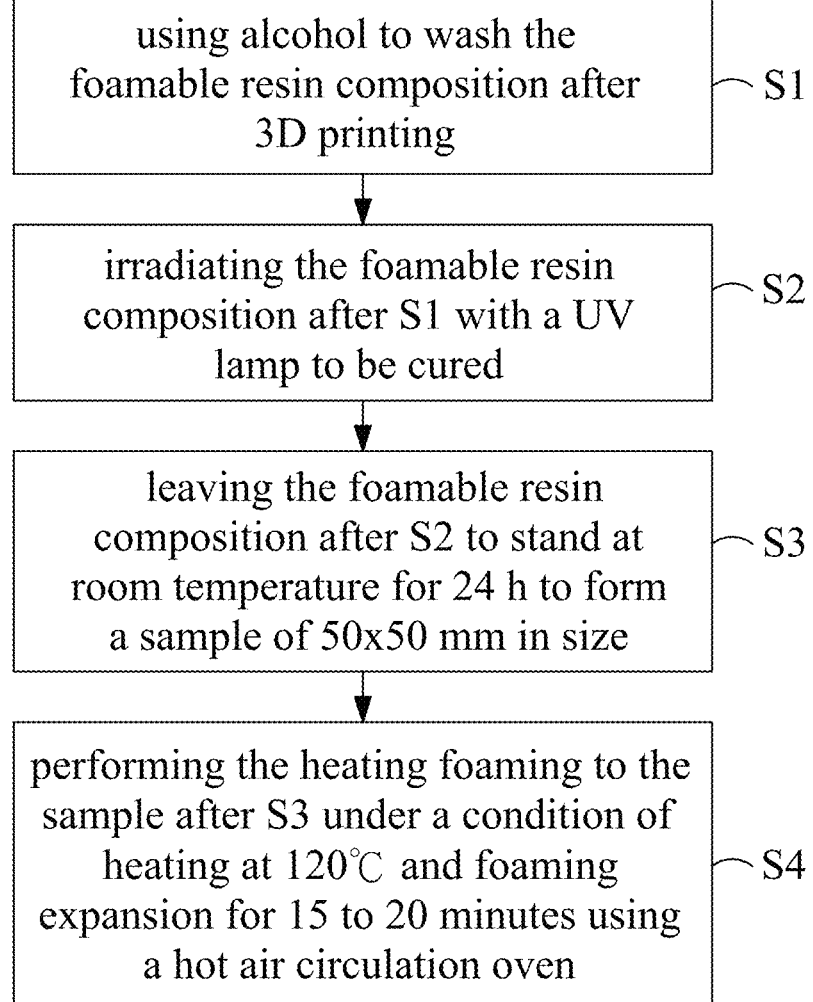
FIG. 1 is a flow chart of a foamable resin composition carrying out photocuring and thermal foam expansion of the present disclosure.

The implementation of the present disclosure is illustrated by the specific embodiments as follows, so one skilled in the art may understand other advantages and effects of the present disclosure by the contents disclosed in the specification. The present disclosure may also be implemented or applied by other embodiments, and the details in the specification may also be based on different views and applications without departing from the spirit of the present disclosure for various modifications and variations.

Unless otherwise specified herein, the term "or" used in the specification and the claims attached includes the meaning of "and/or".

Unless otherwise specified herein, the term "A-B" used in the specification and the claims attached includes the meaning of "A or more and B or less". For example, the term "10-40 wt %" includes the meaning of "10 wt % or more and 40 wt % or less".

<Foamable Resin Composition>

The foamable resin composition of the present disclosure comprises (meth)acrylate oligomer, (meth)acrylate monomer, a photocuring initiator and a foaming agent, and may further comprise zinc oxide as a foaming aid and/or other ingredients as necessary. Further, the aforementioned foamable resin composition has a specific gravity of 0.10-1.05 g/cm$^3$ after photocuring and thermal foam expansion for 15-20 minutes at 120° C. The various ingredients comprised in the foamable resin composition of the present disclosure are described below.

<(Meth)Acrylate Oligomer>

In the present disclosure, the (meth)acrylate oligomer accounts for 10-40 wt % of the foamable resin composition, and preferably 20-30 wt %. Further, the (meth)acrylate oligomer may be polyurethane (meth)acrylate or full acrylate oligomer; wherein, the polyurethane (meth)acrylate may contain aliphatic polyurethane (meth)acrylate or aromatic polyurethane (meth)acrylate.

In one embodiment, a glass transition temperature (Tg) of the (meth)acrylate oligomer is less than 50° C., and preferably less than 25° C., more preferably less than 0° C. This is because if the Tg of the (meth)acrylate oligomer is too high, it will make the obtained foamable resin composition hard and not easy to foam, and thus it is not suitable for use. Moreover, when the (meth)acrylate oligomer is an aromatic acrylate oligomer, it is also prone to yellowing when heated at a high temperature, and thus it is not suitable for use.

Further, in one embodiment, a rate of elongation of (meth)acrylate oligomer is 100-1000%, and preferably 200-900%. This is because the rate of elongation of the (meth) acrylate oligomer is positively correlated with the rate of elongation and expansion ratio of the foamable resin composition (referring to Table 1-Table 2 below), and thus the elongation is preferably 100% or more. In addition, in order to ensure the mechanical properties of molded products (such as 3D printed plastic products) of the foamable resin composition, the rate of elongation is preferably less than 1000%.

Further, although the cause has not been made clear, the inventors have found that by reducing the crosslinking density (or increasing the molecular weight) of (meth) acrylate oligomer or (meth)acrylate monomer, the crosslinking density of the foamable resin composition can be reduced and it can still plastically flow when heated, and the molded product can be foamed and expanded like a thermoplastic resin. Further, the inventors have found that by (meth)acrylate oligomer introduced with ethylene oxide (EO) or propylene oxide (PO), the foamable resin composition will be more flexible, and more suitable for foaming.

<(Meth)Acrylate Monomer>

In the present disclosure, the (meth)acrylate monomer accounts for 35-80 wt % of the foamable resin composition, and preferably 60-70 wt %. Further, the (meth)acrylate monomer may comprise a monofunctional monomer and a bifunctional monomer. Here, the monofunctional monomer accounts for 20-80 wt % of (meth)acrylate monomer, and preferably accounts for 30-80 wt %. Further, the bifunctional monomer accounts for 0-30 wt % of (meth)acrylate monomer, and preferably accounts for 0-20 wt %.

In one embodiment, the foregoing monofunctional group is at least any one selected from the group consisting of the following: isobornyl acrylate (IBOA), isobornyl methacrylate (IBOMA), 2-phenoxy ethyl acrylate, monofunctional polyurethane acrylate (e.g., products from Rahn, Genomer 1122), o-phenylphenol EO acrylate (OPPEA), cyclic trimethylolpropane formal acrylate (CTFA), tetrahydrofurfuryl acrylate (THFA), lauryl acrylate, acryloylmorpholine (ACMO), N-vinylpyrrolidone (2-NVP) and ethoxyethoxyethyl acrylate (EOEOEA). Among them, isobornyl acrylate and ethoxyethoxyethyl acrylate are preferable.

Further, in one embodiment, the foregoing bifunctional monomer is at least any one selected from the group consisting of the following: polyethylene glycol 400 diacrylate (PEG400DA), polyethylene glycol 600 diacrylate (PEG600DA), polyethylene glycol 1000 diacrylate (PEG1000DA), neopentyl glycol 2PO diacrylate (NPG (2PO)DA), bisphenol A 2EO diacrylate (BPA(2EO)DA), bisphenol A 4EO diacrylate (BPA(4EO)DA), bisphenol A 10EO diacrylate (BPA(10EO)DA), bisphenol A 30EO diacrylate (BPA(30EO)DA). Among them, bisphenol A 10EO diacrylate and bisphenol A 30EO diacrylate are preferable.

<Photocuring Initiator>

In the present disclosure, the photocuring initiator accounts for 1-5 wt % of the foamable resin composition, and preferably 2-3 wt %. Further, the photocuring initiator may be selected from diphenyl-(2,4,6-trimethylbenzoyl) phosphine oxide (also referred to as TPO) or bis(2,4,6-trimethylbenzoyl)-phenylphosphine oxide.

The foamable resin composition of the present disclosure may be cured by illumination, and preferably suitable for 3D molding equipment using light with a wavelength of 395-405 nm. Therefore, it is preferable to use DarocurTPO by BASF as a photocuring initiator under photocuring conditions with a light wavelength of 395-405 nm. In addition, Irgacure 819, Irgacure 379 or Irgacure 784 (all of which are products from BASF) can be used as photocuring initiators under photocuring conditions with 395-405 nm.

<Foaming Agent>

In the present disclosure, the foaming agent accounts for 3-20 wt % of the foamable resin composition, and preferably 3-15 wt %. Further, considering that 3D printing molding cannot use a physical foaming agent with molds, so the foregoing foaming agent may be at least any one chemical foaming agent selected from the group consisting of the following: azodicarbonamide (ADC), calcium carbonate, magnesium carbonate, sodium bicarbonate, 4,4'-oxydibenzenesulfonyl hydrazide (OBSH) and foamed microspheres (e.g., products from Nouryon, foamed microspheres Expancel 551DU40). Among them, because azodicarbonamide (ADC) has the advantages of large gas emission, not affecting curing and molding speed, etc., and can be applied to the foaming of sole, insole, plastic wallpaper, ceiling material, floor leather, artificial leather, heat insulation material, sound insulation material and other low specific gravity material, it is preferable.

<Foaming Aid>

The inventors have found that the foaming temperature can be reduced by adding zinc oxide. Thus, the foamable resin composition of one embodiment further comprises: zinc oxide, which accounts for 1-5 wt % of the aforementioned foamable resin composition, and preferably 3 wt %.

Furthermore, zinc oxide can use commercially available products, such as (zinc oxide produced by EverZinc, product name: Zinc Oxide EPM).

<Other Ingredients>

In terms of other ingredients, it can be adapted to the needs, without affecting the effect that the foamable resin composition of the present disclosure can achieve, other ingredients such as known defoamers, leveling aids, inorganic filler materials, pigments and UV light absorbers can be added. In addition, the amount of other ingredients may be 0-2 wt % of the foamable resin composition.

EMBODIMENTS

Although the present disclosure is specifically illustrated by various embodiments and comparative examples, the present disclosure is not limited to the embodiments and comparative examples.

Embodiment 1

Referring to the composition of Table 1 below, 20 parts by weight (20 g) of polyurethane acrylate (made by Sartomer company, CN973J75), 20 parts by weight of isobornyl acrylate (made by Sartomer company, SR506), 28.95 parts by weight of ethoxyethoxyethyl acrylate (made by Sartomer company, SR256) and 20 parts by weight of bisphenol A 10EO diacrylate (made by Sartomer company, SR602) are sequentially added to a container, stirred by a blender for 30 minutes, until evenly dissolved completely, and then 0.05 parts by weight of 2,5-bis-(5-tert-butyl-2-benzoxazolyl)thiophene as a fluorescent brightener OB, 3.00 parts by weight of Darocur TPO and 8 parts by weight of azodicarbonamide (ADC-110 from Goyenchem) are added. Next, the mixture is stirred for 15 minutes, and filtered to remove impurities, left to stand to complete defoaming to obtain the foamable resin composition 1 of Embodiment 1, and the viscosity is measured at 25° C. according to ASTM D 7867 method. Here, unless otherwise specified, the numbers shown in Table 1 are wt %.

Next, the foamable resin composition 1 is added to the photocuring 3D printing equipment for printing. The photocuring 3D printing equipment used here are respectively Phrozen Sonic Mighty 4K 9.3 and Phrozen Sonic Mini 8K of Phrozen Technology, and their print exposure parameters are shown in Table 3 below.

Next, referring to FIG. 1, the foamable resin composition 1 after 3D printing is performed photocuring and thermal foam expansion. First, the foamable resin composition 1 after 3D printing is sufficiently washed with alcohol to remove excess residual liquid resin (step 51). Next, the foamable resin composition 1 after 51 is cured by a UV lamp (light wavelength of 405 nm) for 30 minutes, so that each surface of the cured molded foamable resin composition 1 can fully receive photocuring and achieve a sufficient conversion rate (step S2). Then, the foamable resin composition 1 after S2 is left to stand at room temperature for 24 hours, so that the internal stresses can be released uniformly to form a sample of 50×50 mm in size (step S3). Finally, for the sample of the foamable resin composition 1 after S3, the thermal foam expansion step (step S4) is performed under a condition of heating at 120° C. and foaming expansion for 15 to 20 minutes using a hot air circulation oven. In addition, a rate of elongation of the foamable resin composition 1 is measured by ASTM D638 measurement method, a specific gravity (g/cm³) after thermal foam expansion is measured by ASTM D792 measurement method, and a single-dimensional size expansion ratio % is calculated by comparing the size before and after foaming. Further, the above viscosity, rate of elongation, specific gravity after foaming (g/cm³) and single-dimensional size expansion ratio % are summarized in Table 1.

Embodiment 2

In addition to changing the addition of ethoxyethoxyethyl acrylate in Embodiment 1 to 25.95 parts by weight, and adding 3 parts by weight of zinc oxide together when adding the foaming agent (azodicarbonamide), other conditions are the same as Embodiment 1, and the foamable resin composition 2 of Embodiment 2 is obtained. As in Embodiment 1, the viscosity, rate of elongation, specific gravity after foaming (g/cm³) and single-dimensional size expansion ratio % of the foamable resin composition 2 are determined, and the results are summarized in Table 1.

Embodiment 3

In addition to changing polyurethane acrylate (made by Sartomer company, CN973J75) in Embodiment 1 to polyurethane acrylate (made by Sartomer company, CN966J75), other conditions are the same as Embodiment 1, and the foamable resin composition 3 of Embodiment 3 is obtained. As in Embodiment 1, the viscosity, rate of elongation, specific gravity after foaming (g/cm³) and single-dimensional size expansion ratio % of the foamable resin composition 3 are determined, and the results are summarized in Table 1.

Embodiment 4

In addition to changing bisphenol A 10EO diacrylate (made by Sartomer company, SR602) in Embodiment 3 to bisphenol A 30EO diacrylate (made by Sartomer company, SR9038), other conditions are the same as Embodiment 3, and the foamable resin composition 4 of Embodiment 4 is obtained. As in Embodiment 1, the viscosity, rate of elongation, specific gravity after foaming (g/cm³) and single-dimensional size expansion ratio % of the foamable resin composition 4 are determined, and the results are summarized in Table 1.

Embodiment 5

In addition to changing the addition of bisphenol A 30EO diacrylate (made by Sartomer company, SR9038) in Embodiment 4 to 5 parts by weight, and the addition of ethoxyethoxyethyl acrylate (made by Sartomer company, SR256) to 43.95 parts by weight, other conditions are the same as Embodiment 4, and the foamable resin composition 5 of Embodiment 5 is obtained. As in Embodiment 1, the viscosity, rate of elongation, specific gravity after foaming (g/cm³) and single-dimensional size expansion ratio % of the foamable resin composition 5 are determined, and the results are summarized in Table 1.

Embodiment 6

In addition to changing the addition of ethoxyethoxyethyl acrylate (made by Sartomer company, SR256) in Embodiment 5 to 41.95 parts by weight, and using 10 parts by weight of foamed microspheres (made by Nouryon company, Expancel 551DU40) to replace azodicarbonamide, other conditions are the same as Embodiment 5, and the foamable resin composition 6 of Embodiment 6 is obtained. As in Embodiment 1, the viscosity, rate of elongation, specific gravity after foaming (g/cm³) and single-dimensional size expansion ratio % of the foamable resin composition 6 are determined, and the results are summarized in Table 1 and Table 2.

Embodiment 7

In addition to changing polyurethane acrylate (made by Sartomer company, CN966J75) in Embodiment 6 to polyurethane acrylate (made by Sartomer company, CN8887NS), other conditions are the same as Embodiment 6, and the foamable resin composition 7 of Embodiment 7 is obtained. As in Embodiment 1, the viscosity, rate of elongation, specific gravity after foaming (g/cm³) and single-dimensional size expansion ratio % of the foamable resin composition 7 are determined, and the results are summarized in Table 1.

Embodiment 8

In addition to changing the foamed microspheres in Embodiment 6 to 4,4'-oxydibenzenesulfonyl hydrazide (OBSH) (made by GYC group), other conditions are the same as Embodiment 6, and the foamable resin composition 8 of Embodiment 8 is obtained. As in Embodiment 1, the viscosity, rate of elongation, specific gravity after foaming (g/cm³) and single-dimensional size expansion ratio % of the foamable resin composition 8 are determined, and the results are summarized in Table 2.

Comparative Example 1

In addition to changing polyurethane acrylate (made by Sartomer company, CN966J75) in Embodiment 6 to epoxy acrylate (made by Sartomer company, CN120NS), other conditions are the same as Embodiment 6, and the foamable resin composition A of Comparative example 1 is obtained. As in Embodiment 1, the viscosity, rate of elongation, specific gravity after foaming (g/cm³) and single-dimensional size expansion ratio % of the foamable resin composition A are determined, and the results are summarized in Table 2.

Comparative Example 2

In addition to changing bisphenol A 30EO diacrylate (made by Sartomer company, SR9038) in Embodiment 6 to dipropylene glycol diacrylate (DPGDA) (made by Sartomer company, SR508NS), other conditions are the same as Embodiment 6, and the foamable resin composition B of Comparative example 2 is obtained. As in Embodiment 1, the viscosity, rate of elongation, specific gravity after foaming (g/cm³) and single-dimensional size expansion ratio % of the foamable resin composition B are determined, and the results are summarized in Table 2.

Comparative Example 3

In addition to changing the addition of ethoxyethoxyethyl acrylate (made by Sartomer company, SR256) in Embodiment 6 to 11.95 parts by weight, and the addition of bisphenol A 30EO diacrylate (made by Sartomer company, SR9038) to 35.00 parts by weight, other conditions are the same as Embodiment 6, and the foamable resin composition C of Comparative example 3 is obtained. As in Embodiment 1, the viscosity, rate of elongation, specific gravity after foaming (g/cm³) and single-dimensional size expansion ratio % of the foamable resin composition C are determined, and the results are summarized in Table 2.

TABLE 1

| ingredient | product code | E1 | E2 | E3 | E4 | E5 | E6 | E7 |
|---|---|---|---|---|---|---|---|---|
| polyurethane acrylate | CN973J75 | 20.00 | 20.00 | — | — | — | — | — |
| | CN966J75 | — | — | 20.00 | 20.00 | 20.00 | 20.00 | — |
| | CN8887 NS | — | — | — | — | — | — | 20.00 |
| isobornyl acrylate | SR506 | 20.00 | 20.00 | 20.00 | 20.00 | 20.00 | 20.00 | 20.00 |
| ethoxyethoxyethyl acrylate | SR256 | 28.95 | 25.95 | 28.95 | 28.95 | 43.95 | 41.95 | 41.95 |
| bisphenol A 10EO diacrylate | SR602 | 20.00 | 20.00 | 20.00 | — | — | — | — |
| bisphenol A 30EO diacrylate | SR9038 | — | — | — | 20.00 | 5.00 | 5.00 | 5.00 |
| diphenyl(2,4,6-trimethylbenzoyl)-phosphine oxide | Darocur TPO | 3.00 | 3.00 | 3.00 | 3.00 | 3.00 | 3.00 | 3.00 |
| UV absorber | fluorescent brightener OB | 0.05 | 0.05 | 0.05 | 0.05 | 0.05 | 0.05 | 0.05 |
| azodicarbonamide | Goyenchem-ADC-110 | 8.00 | 8.00 | 8.00 | 8.00 | 8.00 | — | — |
| zinc oxide | Zinc Oxide EPM | — | 3.00 | — | — | — | — | — |
| foamed microspheres | Expancel 551DU40 | — | — | — | — | — | 10.00 | 10.00 |
| composition content total % | | 100.00 | 100.00 | 100.00 | 100.00 | 100.00 | 100.00 | 100.00 |
| rate of elongation before foaming % | | 63 | 63 | 103 | 118 | 155 | 161 | 288 |
| single-dimensional size expansion ratio % | | 6 | 8 | 12 | 16 | 22 | 22 | 36 |
| specific gravity after foaming g/cm³ | | 0.96 | 0.90 | 0.81 | 0.73 | 0.63 | 0.63 | 0.45 |
| viscosity@25° C., unit: cps | | 420 | 515 | 410 | 455 | 403 | 403 | 584 |
| minimum foaming temperature ° C. | | 200 | 150 | 200 | 200 | 200 | 100 | 100 |

TABLE 2

| ingredient | product code | E6 | E8 | CE1 | CE2 | CE3 |
|---|---|---|---|---|---|---|
| polyurethane acrylate | CN966J75 | 20.00 | 20.00 | — | 20.00 | 20.00 |
| epoxy acrylate | CN120 NS | — | — | 20.00 | — | — |
| isobornyl acrylate | SR506 | 20.00 | 20.00 | 20.00 | 20.00 | 20.00 |
| ethoxyethoxyethyl acrylate | SR256 | 41.95 | 41.95 | 41.95 | 41.95 | 11.95 |
| bisphenol A 30EO diacrylate | SR9038 | 5.00 | 5.00 | 5.00 | — | 35.00 |
| dipropylene glycol diacrylate | SR508 NS | — | — | — | 5.00 | — |
| diphenyl(2,4,6-trimethylbenzoyl)-phosphine oxide | Darocur TPO | 3.00 | 3.00 | 3.00 | 3.00 | 3.00 |
| UV absorber | fluorescent brightener OB | 0.05 | 0.05 | 0.05 | 0.05 | 0.05 |
| azodicarbonamide | Goyenchem-ADC-110 | — | — | — | — | — |
| zinc oxide | Zinc Oxide EPM | — | — | — | — | — |
| foamed microspheres | Expancel 551DU40 | 10.00 | — | 10.00 | 10.00 | 10.00 |
| 4,4'-oxydibenzenesulfonyl hydrazide | GYC Group | — | 10.00 | — | — | — |
| composition content total % | | 100.00 | 100.00 | 100.00 | 100.00 | 100.00 |
| rate of elongation before foaming % | | 161 | 165 | 13 | 19 | 14 |
| single-dimensional size expansion ratio % | | 22 | 24 | 0 | 0.6 | 0 |
| specific gravity after foaming g/cm³ | | 0.63 | 0.60 | 1.14 | 1.13 | 1.14 |
| viscosity@25° C., unit: cps | | 403 | 422 | 398 | 390 | 457 |
| minimum foaming temperature ° C. | | 100 | 160 | cannot be foamed | almost cannot be foamed | cannot be foamed |

TABLE 3

| equipment | Phrozen Sonic Mighty | Phrozen Sonic Mini 8K |
|---|---|---|
| layer height | 50-100 μm | 50-100 μm |
| bottom layer | 1-2 layer(s), 5-10 seconds | 1-2 layer(s), 5-8 seconds |
| general layer | 10-15 seconds | 5-8 seconds |
| light-off delay | resting time mode 4-6 seconds | resting time mode 4-6 seconds |

Results for Embodiment 1

Product CN973J75 used by Embodiment 1 is aromatic polyurethane acrylate, which has a rate of elongation of 144%, a glass transition temperature (Tg) is −31° C. Further, as shown in Table 1, a viscosity of the foamable resin composition 1 of Embodiment 1 at 25° C. is 420 cps, and the minimum foaming temperature is 200° C., a size after foaming is 53×53 mm (i.e., a single-dimensional size expansion ratio is 6%), and a specific gravity after foaming is 0.96 g/cm³. It can be seen that the foamable resin composition 1 of Embodiment 1 can be used as an original material for 3D printing. However, because the minimum foaming temperature of the foamable resin composition 1 of Embodiment 1 is 200° C., this temperature may cause yellowing of polyurethane acrylate, there is still room for further improvement.

Results for Embodiment 2

As previously described, zinc oxide as a foaming aid is added in Embodiment 2. Further, as shown in Table 1, the minimum foaming temperature of the foamable resin composition 2 of Embodiment 2 is reduced to 150° C. Further, a viscosity of the foamable resin composition 2 of Embodiment 2 at 25° C. is 515 cps, a size after foaming is 54×54 mm (i.e., a single-dimensional size expansion ratio is 8%), and a specific gravity after foaming is 0.90 g/cm³. It can be seen that the foamable resin composition 2 of Embodiment 2 can be used as an ideal original material for 3D printing.

Results for Embodiment 3

For Embodiment 3, the difference from Embodiment 1 is that aromatic polyurethane acrylate (product CN973J75) is replaced with aliphatic polyurethane acrylate (product CN966J75). Further, a rate of elongation of aliphatic polyurethane acrylate used in Embodiment 3 is 238%, and the glass transition temperature (Tg) is −33° C. Next, as shown in Table 1, after replacing CN973J75 with CN966J75, because the rate of elongation is 238%, which is greater than 144% of CN973J75, a size of the foamable resin composition 3 of Embodiment 3 after foaming is 56×56 mm (single-dimensional size expansion ratio is 12%), which is significantly higher than 6% of the expansion ratio of Embodiment 1; and a specific gravity of the foamable resin composition 3 after foaming is 0.81 g/cm³, which is also significantly lower than 0.96 g/cm³ of Embodiment 1. Further, a viscosity and the minimum foaming temperature of the foamable resin composition 3 of Embodiment 3 are not much different from Embodiment 1. It can be seen that the foamable resin composition of Embodiment 3 can be used as a more ideal original material for 3D printing, and a foaming aid can be further added to reduce the minimum foaming temperature.

Results for Embodiment 4

For Embodiment 4, the difference from Embodiment 3 is that bisphenol A 10EO diacrylate (product SR602) is replaced with bisphenol A 30EO diacrylate (product SR9038). Further, as shown in Table 1, because the molecular weight of bisphenol A 30EO diacrylate (Mw: 1656) is significantly greater than the molecular weight of bisphenol A 10EO diacrylate (Mw: 776), and Tg is relatively low (product SR602 is −7° C., product SR9038 is −57° C.), it can further increase a size of the foamable resin composition 4 of Embodiment 4 after foaming to be 58×58 mm (single-dimensional size expansion ratio of 16%). Further, as shown in Table 1, a specific gravity of the foamable resin composition 4 after foaming is 0.73 g/cm³, which is also significantly lower than 0.81 g/cm³ of Embodiment 3. It can be seen that the foamable resin composition 4 of Embodiment 4 can be used as a more ideal original material for 3D printing.

Results for Embodiment 5

For Embodiment 5, the difference from Embodiment 4 is that part of bisphenol A 30EO diacrylate is replaced with ethoxyethoxyethyl acrylate. Further, as shown in Table 1, by increasing the proportion of monofunctional monomers (isobornyl acrylate and ethoxyethoxyethyl acrylate) and reducing the proportion of bifunctional monomers (bisphenol A 30EO diacrylate), i.e., the degree of crosslinking of (meth)acrylate monomers is reduced, it can further increase a size of the foamable resin composition 5 of Embodiment 5 after foaming to be 61×61 mm (single dimensional size expansion ratio of 22%). Further, as shown in Table 1, a specific gravity of the foamable resin composition 5 after foaming is 0.63 g/cm³, which is also lower than 0.73 g/cm³ of Embodiment 4. It can be seen that the foamable resin composition 5 of Embodiment 5 can be used as a more ideal original material for 3D printing.

Results for Embodiment 6

For Embodiment 6, the difference from Embodiment 5 is that the azodicarbonamide is replaced with foamed microspheres, and the proportion of ethoxyethoxyethyl acrylate is correspondingly reduced. Further, as shown in Table 1, by using the foamed microspheres, the minimum foaming temperature can be further reduced to 100° C. As for the single-dimensional size expansion ratio, viscosity and specific gravity of the foamable resin composition 6 of Embodiment 6, they are the same as Embodiment 5. It can be seen that the foamable resin composition 6 of Embodiment 6 can begin to foam at a fairly low temperature (100 t), and foamed product will not produce yellowing and has an excellent appearance.

Results for Embodiment 7

For Embodiment 7, the difference from Embodiment 6 is that the polyurethane acrylate (made by Sartomer company, CN966J75) is changed to polyurethane acrylate (made by Sartomer company, CN8887NS). Further, the rate of elongation of polyurethane acrylate used in Embodiment 6 is 238%; and a rate of elongation of polyurethane acrylate used in Embodiment 7 is 822%. Next, as shown in Table 1, after replacing CN966J75 with CN8887NS, because the rate of elongation is 822%, which is greater than 238% of CN966J75, a size of the foamable resin composition 7 of Embodiment 7 after foaming is 68×68 mm (single-dimensional size expansion ratio is 36%), which is significantly higher than 22% of the expansion ratio of Embodiment 6; and a specific gravity of the foamable resin composition 7 after foaming is 0.45 g/cm³, which is also significantly lower than 0.63 g/cm³ of Embodiment 6. Further, as shown in Table 1, a viscosity of the foamable resin composition 7 of Embodiment 7 at 25° C. is 584 cps, greater than 403 cps of the viscosity of the foamable resin composition 6 of Embodiment 6, which is easier to cure and mold. Further, the rate of elongation of the foamable resin composition 7 of Embodiment 7 is 288%, and the single-dimensional size expansion ratio is 36%, which are greater than that of other embodiments. It can be seen that the foamable resin composition 7 of Embodiment 7 can be used as the most ideal original material for 3D printing.

Results for Embodiment 8

For Embodiment 8, the difference from Embodiment 6 is that the foamed microspheres are changed to 4,4'-oxydibenzenesulfonyl hydrazide. Next, as shown in Table 2, although the minimum foaming temperature of Embodiment 8 is 160° C., higher than the 100° C. of the minimum foaming temperature of Embodiment 6, a size of the foamable resin composition 8 of Embodiment 8 after foaming is 62×62 mm (single-dimensional size expansion ratio is 24%), higher than 22% of the expansion ratio of Embodiment 6, and a specific gravity of the foamable resin composition 8 is further reduced to 0.60 g/cm³. It can be seen that the use of 4,4'-oxydibenzenesulfonyl hydrazide has the effects of increasing the expansion ratio and reducing the specific gravity after foaming of the foamable resin composition as compared with the foamed microspheres.

Results for Comparative Example 1

For Comparative example 1, the difference from Embodiment 6 is that polyurethane acrylate is changed to epoxy acrylate. Further, a rate of elongation of epoxy acrylate used in Comparative example 1 is only 3%. Next, as shown in Table 2, after replacing polyurethane acrylate with epoxy acrylate, because the rate of elongation is only 3%, the material itself is too rigid, so that the rate of elongation of the foamable resin composition A is low (only 13%), when heated, it cannot be extended and cannot be foamed, and the single-dimensional expansion ratio is 0% (i.e., unexpanded). Further, a specific gravity of the foamable resin composition A after foaming is 1.14 g/cm³ (equivalent to the specific gravity of unfoamed), which is also significantly higher than 0.63 g/cm³ of Embodiment 6. It can be seen that the foamable resin composition A of Comparative example 1 cannot be used as an original material for 3D printing of the present disclosure.

Results for Comparative Example 2

For Comparative example 2, the difference form Embodiment 6 is that bisphenol A 30EO diacrylate is changed to dipropylene glycol diacrylate. Further, the molecular weight of dipropylene glycol diacrylate used in Comparative example 2 is 242, and the glass transition temperature (Tg) is 104° C. Next, as shown in Table 2, after replacing bisphenol A 30EO diacrylate with dipropylene glycol diacrylate, because the low molecular weight, high Tg, the material itself is too rigid, so that the rate of elongation of the foamable resin composition B is low (only 19%), when heated, it cannot be extended and almost cannot be foamed, and the single-dimensional expansion ratio is only 0.6% (that is, almost unexpanded). Further, a specific gravity of the foamable resin composition B after foaming is 1.13 g/cm³, which is also significantly higher than 0.63 g/cm³ of Embodiment 6. It can be seen that the foamable resin composition B of Comparative example 2 cannot be used as an original material for 3D printing of the present disclosure.

Results for Comparative Example 3

For Comparative example 3, the difference from Embodiment 6 is mainly to reduce the proportion of the monofunctional monomer (ethoxyethoxyethyl acrylate) and increase the proportion of the bifunctional monomer (bisphenol A 30EO diacrylate). Next, as shown in Table 2, when the content of the bifunctional monomer is 35 wt % and the content of the monofunctional monomer is less than the content of the bifunctional monomer, a rate of elongation of the foamable resin composition C is low (only 13%), it cannot be foamed and is unexpanded. Further, a specific gravity of the foamable resin composition C after foaming is 1.14 g/cm$^3$ (equivalent to the specific gravity of unfoamed), which is also significantly higher than 0.63 g/cm$^3$ of Embodiment 6. It can be seen that the foamable resin composition C cannot be used as an original material for 3D printing of the present disclosure.

Further, as can be seen from the above Table 1-Table 2, all the rates of elongation of the foamable resin composition of the present disclosure before foaming are 60% or more, and preferably 100% or more.

Figure 2:
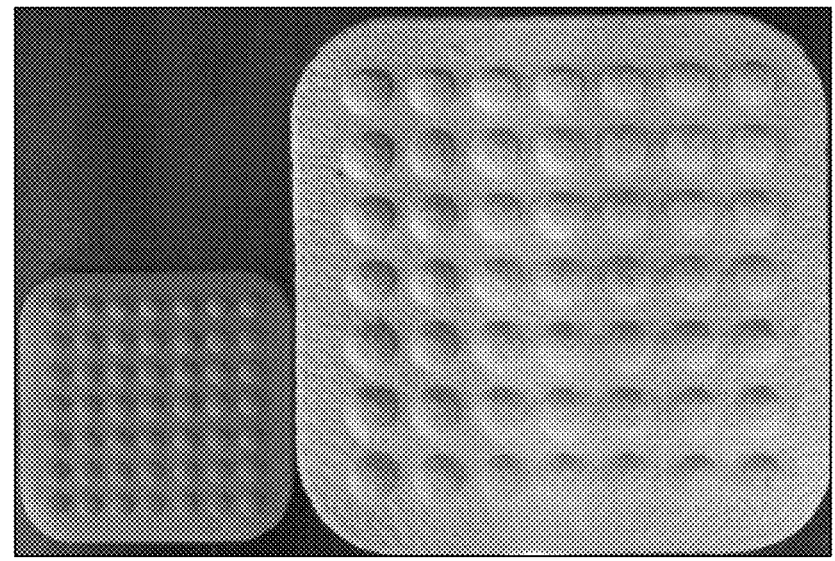
FIG. 2 is an image of a plastic product (coaster) manufactured by 3D printing with the foamable resin composition of the present disclosure.

In summary, the foamable resin composition of the present disclosure can become a low specific gravity (0.10-1.05 g/cm$^3$) material after photocuring and thermal foam expansion, then can expand the application in 3D printing, and manufacturing plastic products, such as shoe soles, coasters, floats, various types of protective gear and the like. Specifically, the foamable resin composition of the present disclosure may manufacture plastic products (coasters) manufactured by 3D printing as shown in FIG. 2.

The present disclosure is not limited to the above embodiments, various changes may be made within the scope of claims, and embodiments obtained by the appropriate combination of the technical means disclosed in the different embodiments are also included within the technical scope of the present disclosure.

What is claimed is:

1. A foamable resin composition, comprising:
   polyurethane acrylate, accounting for 10-40 wt % of the foamable resin composition;

(meth)acrylate monomer, accounting for 35-80 wt % of the foamable resin composition;
   a photocuring initiator, accounting for 1-5 wt % of the foamable resin composition;
   a foaming agent, accounting for 3-20 wt % of the foamable resin composition,
   wherein the foamable resin composition has a specific gravity of 0.10-1.05 g/cm$^3$ after photocuring and thermal foam expansion for 15-20 minutes at 120° C.,
   wherein the (meth)acrylate monomer comprises a monofunctional monomer and a bifunctional monomer of 5-30 wt %,
   wherein the monofunctional monomer is at least any one selected from the group consisting of the following: isobornyl acrylate and ethoxyethoxyethyl acrylate, and
   wherein the bifunctional monomer is at least any one selected from the group consisting of the following: bisphenol A 10EO diacrylate and bisphenol A 30EO diacrylate.

2. The foamable resin composition according to claim 1, wherein the polyurethane acrylate has a glass transition temperature less than 50° C., and a rate of elongation of 100-1000%.

3. The foamable resin composition according to claim 1, wherein the photocuring initiator is selected from diphenyl-(2,4,6-trimethylbenzoyl) phosphine oxide or bis(2,4,6-trimethylbenzoyl)-phenylphosphine oxide.

4. The foamable resin composition according to claim 1, wherein the foaming agent is at least any one selected from the group consisting of the following: azodicarbonamide, calcium carbonate, magnesium carbonate, sodium bicarbonate, 4,4'-oxydibenzenesulfonyl hydrazide and foamed microspheres.

5. The foamable resin composition according to claim 1, wherein a viscosity of the foamable resin composition at 25° C. is 150-1000 cps.

6. The foamable resin composition according to claim 1, wherein the foamable resin composition further comprises: zinc oxide, accounting for 1-5 wt % of the foamable resin composition.

7. The foamable resin composition according to claim 1, wherein a single-dimensional size expansion ratio of the foamable resin composition after thermal foam expansion at 120° C. is 5-50%.

* * * * *